No. 892,947.

PATENTED JULY 7, 1908.

W. W. EARL.
SPEED CHANGING MECHANISM.
APPLICATION FILED JULY 10, 1905.

3 SHEETS—SHEET 1.

Witnesses
Roy D. Tolman.
Penelope Cumberbach.

Inventor
William W. Earl.
By Rufus B. Fowle,
Attorney

No. 892,947.

PATENTED JULY 7, 1908.

W. W. EARL.
SPEED CHANGING MECHANISM.
APPLICATION FILED JULY 10, 1905.

3 SHEETS—SHEET 2.

Witnesses
Roy D. Tolman.
Penelope Comberbach.

Inventor
William W. Earl.
By Rufus B. Fowler
Attorney

No. 892,947.

W. W. EARL.
SPEED CHANGING MECHANISM.
APPLICATION FILED JULY 10, 1905.

PATENTED JULY 7, 1908.

3 SHEETS—SHEET 3.

Witnesses
Roy D. Tolman.
Penelope Comberbach.

Inventor
William W. Earl.
By Rufus B. Fowler
Attorney

# UNITED STATES PATENT OFFICE.

WILLIAM W. EARL, OF WORCESTER, MASSACHUSETTS, ASSIGNOR TO WOODWARD & POWELL PLANER COMPANY, OF WORCESTER, MASSACHUSETTS, A CORPORATION OF MASSACHUSETTS.

SPEED-CHANGING MECHANISM.

No. 892,947.   Specification of Letters Patent.   Patented July 7, 1908.

Application filed July 10, 1905. Serial No. 268,936.

*To all whom it may concern:*

Be it known that I, WILLIAM W. EARL, a citizen of the United States, residing at Worcester, in the county of Worcester and Commonwealth of Massachusetts, have invented a certain new and useful Improvement in Speed-Changing Mechanism, of which the following is a specification, accompanied by drawings forming a part of the same, in which—

Figure 1:
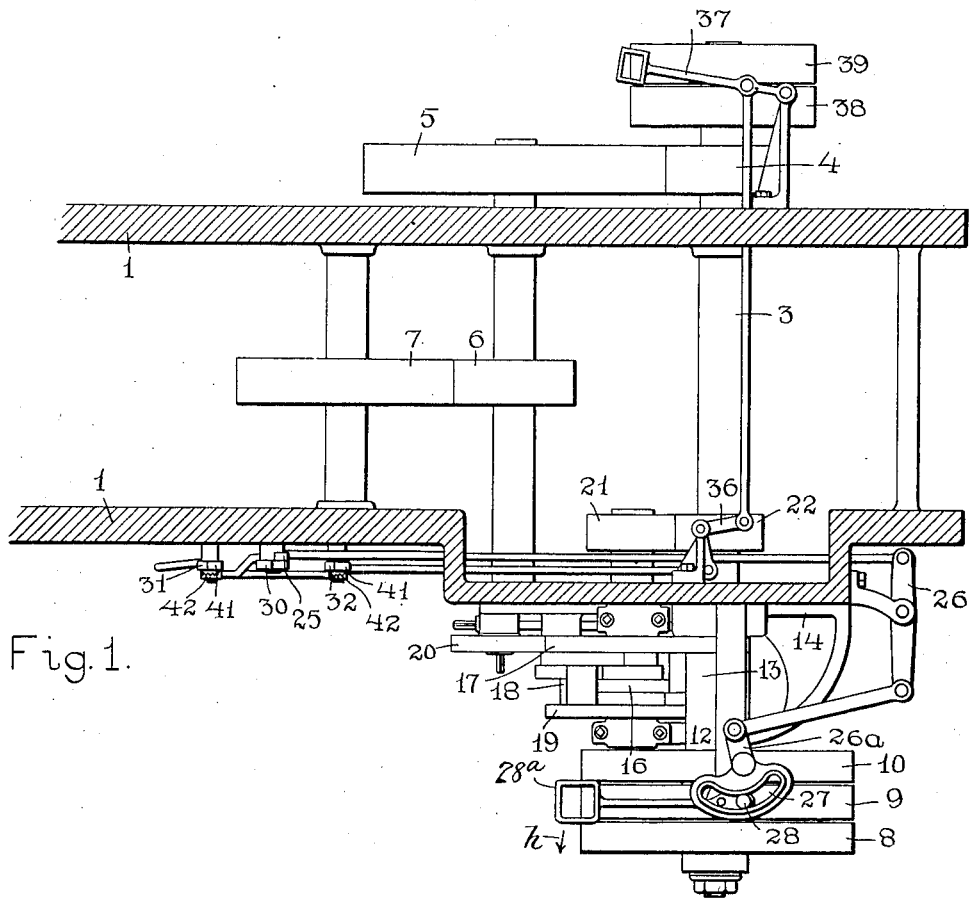
Figure 2:
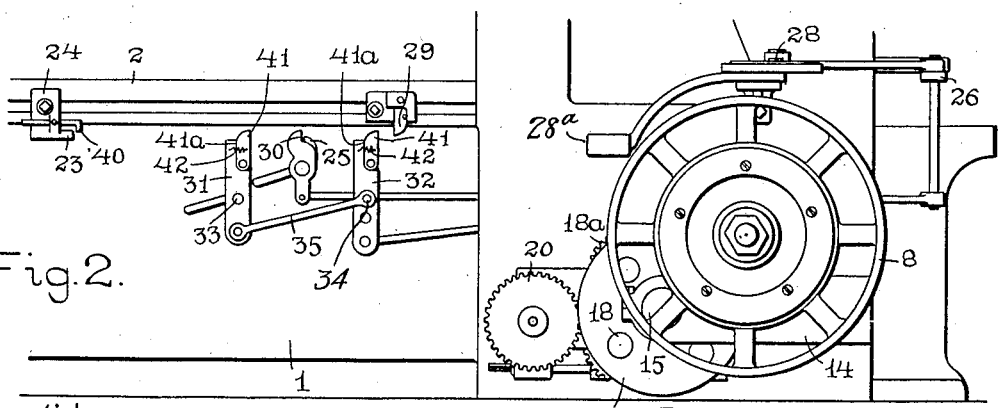
Figure 3:
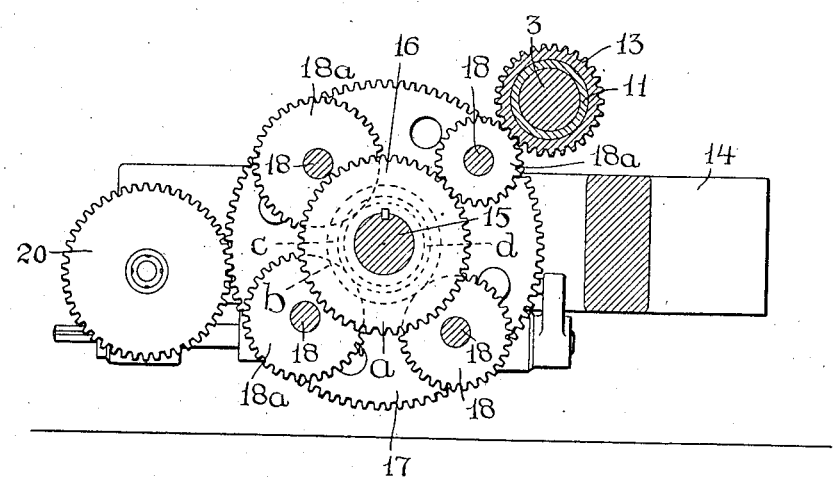
Figure 4:
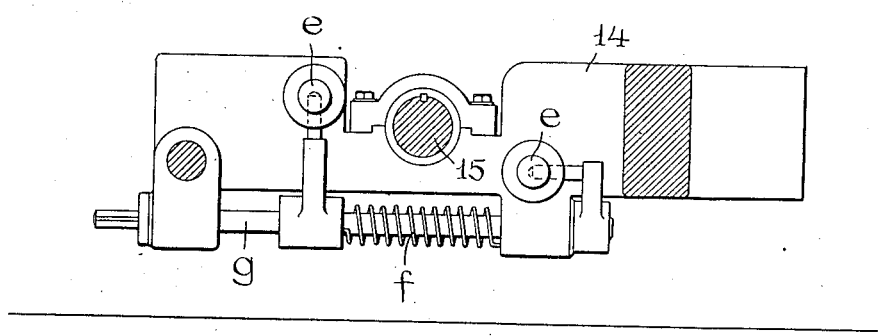
Figure 5:
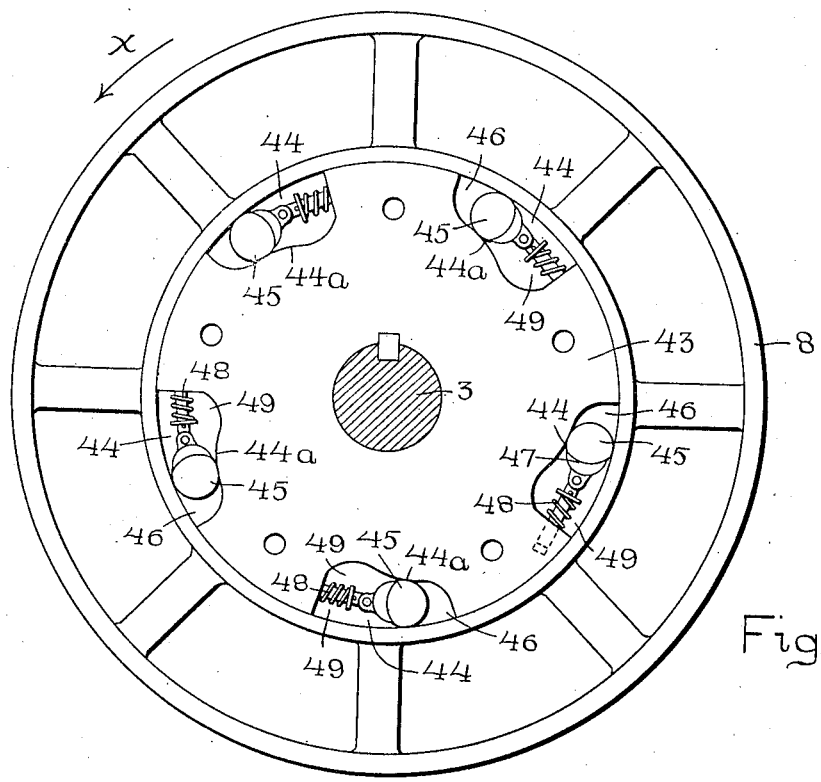
Figure 6:
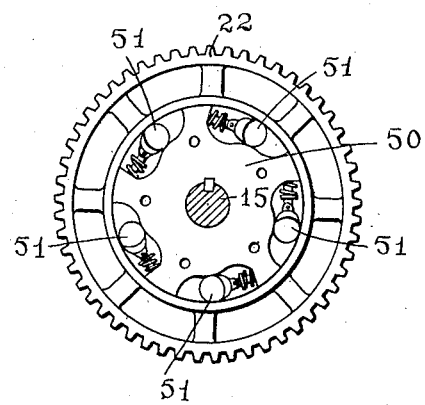

Figure 1 is a top view of a portion of a metal planer embodying my invention, with the planer bed shown in horizontal section just below the platen. Fig. 2 is a side view of a portion of a metal planer embodying my invention. Fig. 3 is a view shown partly in section of a portion of the mechanism for changing the speed on the cutting stroke of the planer. Fig. 4 is a detail of the locking mechanism for the change speed device. Fig. 5 is an end view of one of the driving pulleys with its cover removed, in order to disclose the cam actuated clutch by which the pulley is connected with its shaft, when rotated in one direction. Fig. 6 is an end view of the gear 21 having its cover removed to disclose its cam actuated clutch.

Similar reference letters and figures refer to similar parts in the different views.

My present invention relates to a speed changing mechanism, especially designed to be employed with the reciprocating platen of a metal planing machine, whereby the speed of the table upon its return stroke may be varied independently of its speed upon its cutting stroke; but my improved speed changing device may be applied to other classes of machines.

Referring to the accompanying drawings 1 denotes a portion of the bed of a metal planing machine and 2 the platen; 3 the main driving shaft carrying a pinion 4 connected by gears 5, 6, and 7 with a rack, not shown, on the under side of the platen in the well known manner in machines of this class. One end of the main shaft 3 is provided with a tight belt pulley 8 attached directly to the shaft 3 by a cam actuated clutch, as hereinafter described, by which the shaft is rotated in one direction, a loose belt pulley 9 and a tight belt pulley 10 attached to a sleeve 11 turning loosely on the shaft 3. The sleeve 11 is provided with a hub 12 which is provided with long gear teeth forming a pinion 13. Supported in bearings on a bracket 14 is a spindle 15 to which is keyed a cone gear 16 having steps $a$, $b$, $c$ and $d$, shown in Fig. 3. Turning loosely upon the spindle 15 is a gear plate 17 connected by studs 18 with a plate 19. Turning on the studs 18 are intermediate pinions $18^a$ of different diameters intermeshing with the different steps of the cone gear 16. Rotation of the gear plate 17 which is done by turning the gear 20 by hand brings any one of the intermediate pinions mounted on said studs 18 into engagement with the pinion 13, thereby connecting the spindle 15 with the pinion 13. The arrangement of gears is shown in Fig. 3. The speed of the spindle 15 with reference to the speed of the tight belt pulley 10 will depend upon the relative diameter of the step of the cone gear 16 in mesh with the pinion 13 through any one of the intermediate pinions. The gear plate 17 is locked into the desired position by the locking device shown in Fig. 4, by which locking pins $e$, $e$, are held in holes in the gear plate 17 by the torsional spring $f$ and are withdrawn by the rotation of the rock shaft $g$.

The rotation of the spindle 15 is imparted to the main shaft 3 by means of the pinion 21 attached to the spindle 15, by which the shaft may be rotated in one direction, and engaging a pinion 22 attached by a cam actuated clutch, as hereinafter described, to the main shaft 3. The above device for imparting change in speed to the forward or cutting stroke of the platen is substantially like that described and claimed in Letters Patent No. 780,642, issued to me January 24, 1905, to which reference is hereby made for a more detailed description.

The above described method is that employed in driving the platen upon its forward or cutting stroke. Upon the completion of this stroke the arm 23 of the tappet 24 strikes the reversing dog 25 which by means of the levers 26, $26^a$, and cam slot 27, and pin 28, swings the shipper $28^a$ in the direction of the arrow $h$ and ships the belt from the tight pulley 10 to the tight pulley 8 in the usual manner. The motion imparted to the main shaft by this pulley 8 is the reverse of that resulting from the revolution of the pulley 10 through the gearing above described, thereby reversing the motion of the platen. As in the ordinary metal planing machine the return movement of the platen causes the tappet 29 after a predetermined interval to strike the dog 30, and by means of the levers 26, 26ᵃ and cam slot 27 move the pin 28 in the reverse direction, thereby shipping the belt again upon the tight pulley 10 when the platen again begins its forward movement on its cutting stroke. This method of changing the direction of movement of the platen at each end of its stroke by the contact of the tappet with the reversing dog is also well known and forms no part of my present invention.

It has been found desirable to increase the speed of the platen on the central part of its return stroke, thereby increasing the capacity for work of the planer. My present invention consists in the improved method of accomplishing this quick return, herein described and pointed out in the annexed claims.

Attached to the bed 1 of the planer are supplemental dogs 31, 32, pivoted at 33 and 34, and connected by a link 35. The dog 32 is connected by links and a bell crank 36 with a belt shipper 37 arranged to ship a belt between a tight pulley 38 and a loose pulley 39 attached to the main shaft 3 at the opposite end from the forward driving mechanism above described. This belt shipping mechanism is so arranged that movement of the dog 31 ships the belt from the loose pulley 39 to the tight pulley 38 and movement of the dog 32 ships the belt from the tight pulley 38 to the loose pulley 39. This pulley 38, being of smaller diameter than the pulley 8, will drive the main shaft at an increased speed over the pulley 8, thereby increasing the speed of the return stroke of the platen.

The supplemental dog 31 is arranged to be moved by a hooked arm 40 adjustably held in the tappet 24, while the dog 32 is in the path of the tappet 29. Pivoted at the top of dogs 31 and 32, however, are arms 41, 41, which are adapted to be swung in one direction on their pivots by the arm 40 and tappet 29 upon the forward stroke of the platen, but which are provided with springs 42 which restore said arms 41, 41, to their upright position in the path of arm 40 and tappet 29. The arm 40 and tappet 29, therefore, on the return movement of the platen again strikes said arms 41, 41, thereby moving the supplemental dogs 31 and 32 respectively. The arms 41 contact with shoulders 41ᵃ on the dogs 31 and 32 and their independent rotation backward is thereby prevented.

As the main shaft 3 is revolved at a higher speed by pulley 38 than by pulley 8, means are necessary for disconnecting said pulley 8 from the main shaft when the speed is increased. As shown in Fig. 5 a plate 43 is keyed to the main shaft 3 and provided at its periphery with irregular shaped recesses 44 provided with cam surfaces 44ᵃ. Balls 45 are mounted to revolve in these recesses and contact with an annular rim forming the inner portion of the pulley 8. When the pulley 8 is driving the main shaft 3 and moving in the direction indicated by the arrow $x$ the balls 45 are drawn by the friction of the pulley 8 into the narrower portion 46 of the recesses 44, their motion in this direction being assisted by the supports 47 and springs 48. As the width of this portion of the recesses 44 is less than the diameter of the balls 45, the balls 45 become wedged therein and the motion of the outer portion of the pulley 8 is imparted to the plate 43 and main shaft 3. But when, driven by the pulley 38, the speed of the main shaft 3 is increased beyond that of the pulley 8, the motion of the annular rim of the pulley 8 with reference to the plate 43 is reversed, the balls 45 are retracted into the wider portion 49 of the recesses 44, and the plate 43 is disconnected from the outer or driving portion of the pulley 8. A similar arrangement of plate 50 and balls 51 is provided for pinion 22, as shown in Fig. 6. It is by means of this pinion 22 that forward movement is imparted to the main shaft, and it therefore becomes disconnected whenever the direction of rotation of the main shaft is reversed.

The operation of my improved change speed device for the return stroke of the platen is as follows:—When in the forward movement or cutting stroke of the platen the arm 23 of the tappet 24 strikes the dog 25, the belt is shipped onto the pulley 8 and the platen is started upon its return movement. After this return movement has proceeded for a short distance, the arm 40 on tappet 24 strikes the supplemental dog 31, thereby shipping the belt from the loose pulley 39 onto the tight pulley 38 which increases the speed of the main shaft 3, and hence of the platen. The pulley 8 is disconnected from the main shaft 3 upon its increase in speed by the device already described. When the platen is approaching its limit of backward movement, a short time before the dog 30 is struck by the tappet 29, said tappet 29 strikes the arm 41 on the supplemental dog 32, thereby shipping the belt from the tight pulley 38 to the loose pulley 39. The speed of the main shaft thereupon decreases until pulley 8 is again engaged and the remainder of the return movement of the platen is driven by the pulley 8 at a lower speed, until the tappet 29 engages the dog 30 and the forward or cutting stroke is begun. This increase in speed of the platen is only necessary in long cuts of the planer and the supplemental dogs 31 and 32 are preferably so arranged that approximately nine inches of the beginning and end of the return stroke is driven at a slower speed, while the remainder of the return is at a higher speed. This slower starting and stopping of the platen on its return stroke serves to lessen the jar in starting and stopping the planer.

What I claim as my invention and desire to secure by Letters Patent is:—

1. In a speed changing mechanism, the combination with a shaft and means for rotating said shaft in one direction, of a pulley for reversing said shaft, a tight and a loose pulley of smaller diameter than said reversing pulley mounted on said shaft, means for shipping a belt from said loose to said tight pulley during a portion of the reverse movement of the shaft, whereby said shaft will be driven by said tight pulley during a portion of its reverse movement at a higher rate of speed, and means for disconnecting said first pulley from said shaft during said increase in speed.

2. In a speed changing mechanism, the combination with a shaft and a pair of tight belt pulleys on said shaft, of means for rotating said pulleys at different speeds, means for disconnecting the slower rotating pulley from said shaft when said shaft is driven by the faster rotating pulley, and means for disconnecting said faster rotating pulley from its means of rotation when said shaft is to be driven by said slower rotating pulley.

3. In a speed changing mechanism the combination with a shaft, of a rotating driving pulley, change gears between said pulley and said shaft, whereby the speed of the shaft may be varied, a reversing pulley mounted on said shaft, means for rotating said reversing pulley at a predetermined speed, a second reversing pulley mounted on said shaft, means for rotating said second reversing pulley at a higher rate of speed than said first reversing pulley, means for automatically disconnecting said first reversing pulley from the shaft when the shaft is driven by the second reversing pulley, means for automatically disconnecting said change gears from the shaft during its reverse movement.

4. In a speed changing mechanism, the combination with a shaft, of a driving pulley turning loosely on said shaft, a geared connection between the shaft and said driving pulley, said geared connection comprising a clutching mechanism capable of automatically disconnecting the shaft from the driving pulley during the reverse movement of the shaft, a pulley mounted on said shaft and having a clutch connection therewith capable of rotating the shaft in a reverse direction to said driving pulley, a second reversing pulley attached to said shaft, means for rotating said second reversing pulley to reverse the shaft at a higher rate of speed and adjustable mechanism for connecting and disconnecting said pulleys with the driving power at different periods in the rotation of the shaft.

5. In a speed changing mechanism, the combination with a shaft, a driving pulley for driving said shaft in one direction, a pair of reversing pulleys for reversing the shaft at different speeds, means for automatically connecting and disconnecting said driving pulley with the driving power, means for automatically connecting said reversing pulleys with the driving power at different periods in the rotation of the shaft, and means for automatically disconnecting the slower of said reversing pulleys while the shaft is being reversed by the faster of said reversing pulleys.

6. In a speed changing mechanism, the combination with a shaft, of a rotating driving pulley, change gears between said driving pulley and said shaft, whereby the speed of the shaft may be varied, a reversing pulley attached to said shaft, and means for automatically disconnecting said change gears from the shaft during its return movement.

7. In a speed changing mechanism, the combination with a shaft, of a rotating driving pulley, change gears between said driving pulley and said shaft, whereby the speed of the shaft may be varied, a reversing pulley attached to said shaft for reversing the movement of the shaft, means for increasing the speed of the shaft during its reverse movement, and means for automatically disconnecting from the shaft, both the change gears during the reverse movement of the shaft and also the reversing pulley during said increased speed of said reverse movement.

8. In a speed changing mechanism, the combination with a shaft, of a pulley for driving said shaft in one direction, a pulley for reversing said shaft, means for increasing the speed of said shaft during said reverse movement, and means for disconnecting said reversing pulley from said shaft during said increase in speed.

9. In a speed changing mechanism, the combination with a shaft and means for rotating said shaft in one direction, of a pair of pulleys for reversing said shaft at different speeds, a reciprocating member actuated by said shaft, a tappet adjustably held on said reciprocating member, a rocking dog in the path of said tappet, a belt shipping mechanism for reversing the shaft operatively connected with said dog, a hooked bar adjustably held in said tappet, a second rocking dog in the path of said hooked bar, and a belt shipping mechanism operatively connected with said second dog for bringing the second reversing pulley into action.

10. In a speed changing mechanism, the combination with a shaft and means for rotating said shaft in one direction, means for reversing said shaft, a pulley for increasing the speed of the reverse movement of said shaft, a reciprocating member actuated by said shaft, a tappet held on said reciprocating member with a hooked bar adjustably held therein, a rocking dog in the path of said hooked bar, and a belt shipping mechanism operatively connected with said dog for bringing said reversing pulley into action.

11. In a speed changing mechanism, the combination with a shaft and a pair of tight belt pulleys on said shaft, one of said pulleys fastened to said shaft and the other arranged to be disconnected therefrom, means for rotating the first pulley faster than the second pulley, means for disconnecting said second pulley from said shaft when said shaft is rotated by said first pulley, and means for disconnecting said first pulley from its means of rotation when said shaft is to be driven by said second pulley.

Dated this fifth day of July 1905.

WILLIAM W. EARL.

Witnesses:
PENELOPE COMBERBACH,
RUFUS B. FOWLER.